June 26, 1956 M. G. KROGER 2,752,495

FERROELECTRIC FREQUENCY CONTROL

Filed May 8, 1951

INVENTOR
MARLIN G. KROGER
BY J. L. Whittaker
ATTORNEY

United States Patent Office 2,752,495

Patented June 26, 1956

2,752,495

FERROELECTRIC FREQUENCY CONTROL

Marlin G. Kroger, Princeton, N. J., assignor to Radio Corporation of America, a corporation of Delaware Application May 8, 1951, Serial No. 225,237

12 Claims. (Cl. 250—36)

This invention relates generally to microwave apparatus and more particularly to the utilization of a non-linear substantially reactive ceramic ferroelectric dielectric material disposed within a cavity resonator to control the resonant characteristics thereof.

Heretofore the resonant characteristics of many cavity resonators and particularly magnetron oscillators have been controlled by electron-beam or by magnetron-diode tuning. While these methods are generally satisfactory it is desirable that a more simple and economical means be provided which affords a greater measure of control of the resonant characteristics of these devices.

It is the principal object of the instant invention to provide an improved and simplified means for controlling the resonant characteristic of cavity resonators.

Another object of the invention is to provide a more economical means for controlling the resonant characteristic of cavity resonators.

Another object of the invention is to provide ferroelectric means for controlling the resonant characteristic of cavity resonators wherein said means affords a greater measure of control thereof than do means previously known.

A further object of the invention is to provide improved methods and means for controlling the tuning of a cavity resonator in response to modulating signals.

According to a typical embodiment of the instant invention, a non-linear substantially reactive ceramic ferroelectric dielectric material, selected from the group of ferroelectric materials having a dielectric reactive characteristic which varies with changes in electric field strength applied thereto, is disposed within a cavity resonator at a point of high electric field stress. It is characteristic of these materials that below their Curie temperatures they have a non-linear dielectric constant which varies in accordance with the electric field stresses set up therein.

An external source of variable potential is provided for varying the electric field across the ferroelectric material which, for example, may be barium-titanate. The capacity of a condenser including the titanate is then determined by the instantaneous potential of the variable source. In this manner the electrical energy coupled into the resonator may be modulated in a desired manner.

Additional embodiments are provided further setting forth the teachings of the invention wherein these ferroelectric materials are disposed within microwave magnetron oscillators for frequency-modulation and/or frequency stabilization thereof.

Figure 1:
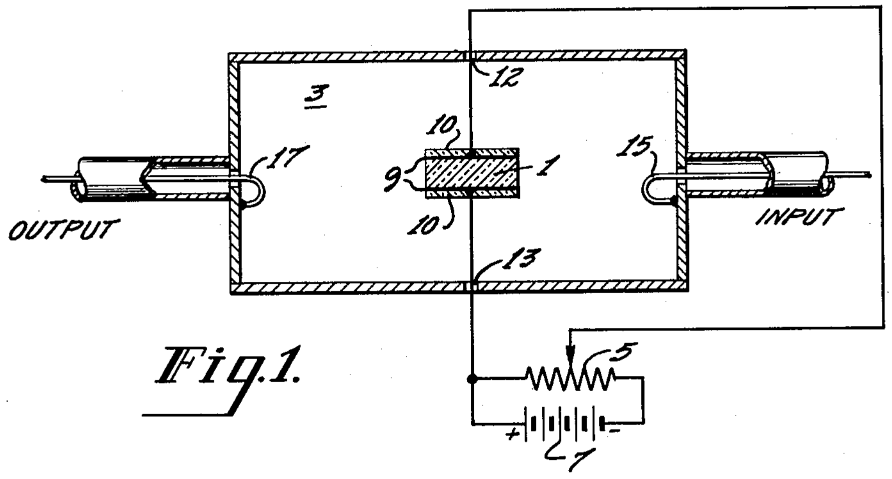
Figures 2, 3:
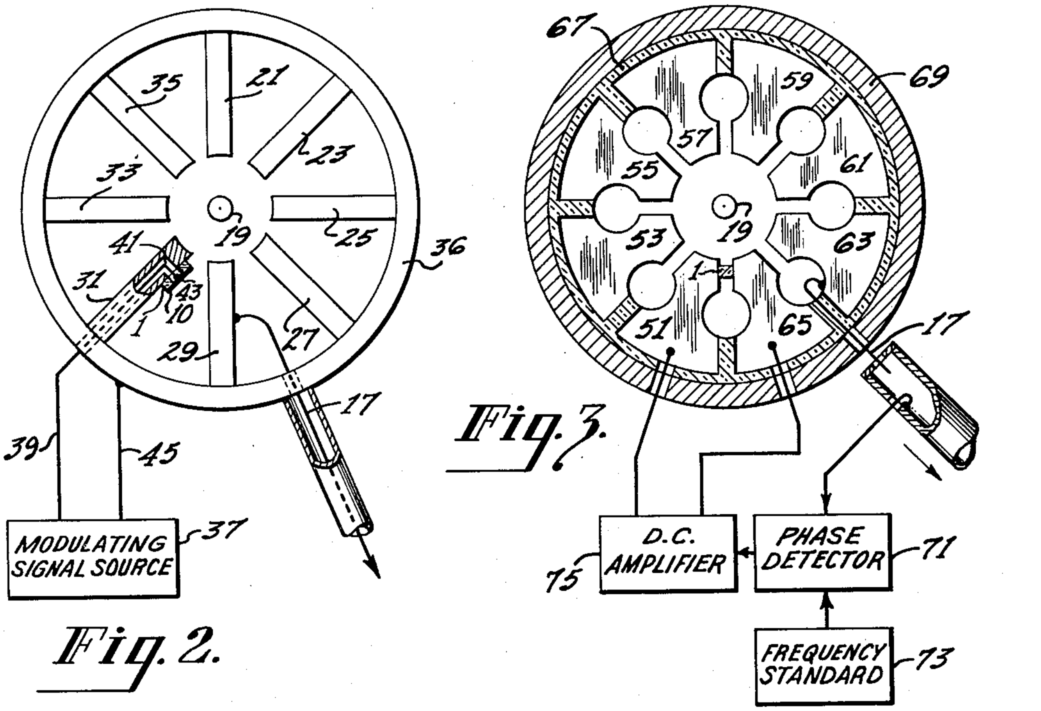

The invention will be described in more detail with reference to the accompanying drawing in which Figure 1 is a schematic circuit diagram of electrical apparatus including a ferroelectric material, utilized according to the invention, for controlling the resonant characteristic of a cavity resonator; Figure 2 is a schematic circuit diagram, partially in block form, of electrical apparatus, according to the invention, for modulating a vane type magnetron oscillator; and Figure 3 is a schematic circuit diagram, partially in block form, of electrical apparatus, according to the invention, for the frequency stabilization of a hole-and-slot type magnetron oscillator.

Like reference characters are applied to like elements throughout the drawing.

Referring to Figure 1, a non-linear substantially reactive ceramic ferroelectric dielectric material 1, selected from the group which includes, for example, barium-titanate, barium-strontium-titanate, barium-stannate, sodium-columbate, sodium-tantalate, potassium-columbate, and potassium-tantalate, is disposed within a cavity resonator 3.

A potentiometer 5 is connected in parallel with a D.-C. voltage supply 7 and provides a means for applying a variable frequency control potential to the ferroelectric material 1, which, for example, is barium-titanate. A thin silvered contact coating 9 is applied to the inner surfaces a pair of energy permeable members 10 and 10 which support the braium titanate. Suitable apertures 12 and 13 are provided in the resonator walls for the introduction of the control potential into the resonator 3.

In operation, electrical energy is coupled into the cavity resonator 3, at a predetermined frequency (for example 300 megacycles) by an input coupling loop 15. An adjustment of the potentiometer 5 varies the strength of the electric field impressed upon the barium titanate 1 and varies the dielectric constant of the ferroelectric material 1 (barium titanate). Hence, it may be seen that by suitably controlling the instantaneous potential applied to the barium titanate, the resonant characteristic of the resonator is changed and energy coupled from the resonator 3 by an output coupling loop 17 is frequency-modulated in accordance with the control potential.

In Figure 2 apparatus is disclosed for frequency-modulating a vane type magnetron. The magnetron includes a cathode electrode 19 and a plurality of anode vanes 21, 23, 25, 27, 29, 31, 33, and 35 which, together with an outer circumferential ring 36 bonded to the vanes, form a plurality of cavity resonators.

The ferroelectric barium-titanate 1 is disposed within one of the cavity resonators, say that which is formed by the circumferential ring 36 and the anode vanes 29 and 31. The titanate 1 is "sandwiched" between one 31 of these two vanes and a silvered energy permeable supporting member 10. A modulating signal source 37 is provided for controlling, in a predetermined manner, the electric field impressed upon the ferroelectric barium titanate. Various means are satisfactory for applying the modulating potential to the non-linear material. One means which is satisfactory is to insert one conductor 39 from the modulating source 37 through an aperture 41 in one of the resonator vanes 31, pass it through a second aperture in the titanate 43, and then securely fasten the conductor to the silvered coating. The remaining conductor 45 from the source 37 may be connected to the outer circumferential ring 36.

It is evident that, as in the embodiment described with reference to Figure 1, the instantaneous electric field set up by the modulating source 37 causes the dielectric constant of the titanate 1 to vary correspondingly. This effectively varies the tuning of the magnetron such that the output energy coupled from the oscillator by an output coupling loop 17 is frequency-modulated. Since the percentage change in capacity with these ferroelectric materials decreases with an increase in frequency, it is preferable for the modulating source to have a rising gain characteristic.

In Figure 3 a hole and slot type magnetron oscillator and other circuitry is illustrated wherein the variable reactive property of these ferroelectric materials may be utilized in the frequency stabilization of the magnetron. The magnetron includes a cathode electrode 19 and a plurality of cavity resonators each of which is formed by adjacent pairs of anode wedges 51, 53, 55, 57, 59, 61, 63, and 65.

The cavities thus formed have a shape similar to that of a "keyhole" wherein the "keyhole slots" extend radially inward. Similarly shaped slots extend radially outward and are filled with an insulating material 67 which extends circumferentially about the plurality of resonators. This insulating material insulates the anode wedges each from the other and also insulates the wedges from an external metallic ring 69 which bounds the magnetron.

One of the resonator slots extending radially inward, for example, that which is formed by the adjacent wedges 51 and 65, is partially filled with any one of the abovementioned ferroelectric materials, which, by way of example, may be barium-titanate.

The magnetron is normally resonant at a frequency determined by the physical construction thereof and also by the effect of the dielectric properties of the barium titanate 1. A portion of the oscillator output signal energy having a frequency of, for example, 300 megacycles is applied to a phase detector 71, to which also are applied signals from a frequency standard 73. A control signal obtained from this phase comparison arrangement is then amplified in a D.-C. amplifier 75. The D.-C. amplifier output is applied to the adjacent anode wedges 51 and 65 between which the titanate is supported. The phase comparison is such that if the oscillator is stable at 300 megacycles the electric field stresses in the titanate 1 are unchanged. Any deviation from the desired output signal frequency is detected in the phase comparison circuitry. Accordingly, the change in the electric field strength applied to the ferroelectric material alters the dielectric constant thereof such that the frequency of the resonator is corrected to the desired value.

It is apparent that the frequency control range of the resonators described may be extended by increasing the amount of ferroelectric material enclosed. In the case of the magnetrons it may be desirable to dispose pieces of the material in several of the resonators. While the effective "Q" of the materials is less than that of air, the amount of capacity variation needed for controlling the resonant characteristic of the resonators is very small. Hence the efficiency of the resonators is not greatly impaired.

What is claimed is:

1. Electrical apparatus comprising a magnetron type microwave generator having a plurality of cavity resonators, a non-linear substantially reactive ceramic ferroelectric material disposed within at least one of said plurality of cavity resonators, and means for varying the substantially reactive characteristic of said disposed ferroelectric material for modulating said magnetron type generator in a predetermined manner.

2. Apparatus as described in claim 1 wherein said microwave generator comprises a hole and slot type magnetron microwave generator.

3. Apparatus as described in claim 1 wherein said microwave generator comprises a vane type magnetron microwave generator.

4. A frequency stabilization system comprising a microwave signal generator for producing a desired wave signal frequency output, a non-linear substantially reactive ceramic ferroelectric dielectric material disposed within said microwave generator, output signal means for coupling energy from said generator, phase comparison means for producing a control signal in response to a deviation in frequency of said desired signal frequency energy, and means responsive to said control signal for controlling the substantially reactive characteristic of said ferroelectric material to control the signal frequency output of said generator.

5. Electrical apparatus comprising a magnetron formed with at least one cavity resonator therein, a non-linear substantially reactive ceramic ferroelectric dielectric material disposed within said cavity resonator, said material being selected from a group which includes barium titanate, barium strontium titanate, barium stannate, sodium columbate, sodium tantalate, potassium columbate, and potassium tantalate, and means for varying the substantially reactive characteristic of said selected ferroelectric material for modulating the output frequency of said magnetron.

6. In combination, a cavity resonator, and means for controlling the output frequency of said cavity resonator including an element positioned in said cavity resonator formed of a material of the type having a dielectric reactive characteristic which varies with changes in electrical field strength applied across said element, and means electrically coupled to said element and responsive to changes from a predetermined value in the output frequency of said cavity resonator for applying an adjustable electric field thereacross in the correct sense and magnitude to maintain said output frequency substantially at said predetermined value.

7. In the combination as set forth in claim 6, said last-named means including a frequency standard providing a signal of reference frequency, and a comparison device for comparing said signal with the signal output of said cavity resonator for deriving therefrom, when they are different in frequency, a control signal for controlling the electric field applied to said element.

8. In combination, a magnetron formed with at least one cavity resonator therein, and means for tuning said magnetron including a pair of conductive members and an element positioned between and in contact with said conductive members, said element being formed of a ceramic, ferroelectric material of the type having a dielectric reactive characteristic which varies with changes in electric field strength applied across said element, said two conductive members and the element between them being positioned within said cavity resonator, and means electrically coupled to said two conductive members for applying an adjustable difference in potential between said members.

9. In combination, a magnetron having a plurality of internal cavity resonators, and means for tuning said magnetron including an element positioned in one of said cavity resonators, formed of a ceramic, ferroelectric material of the type having a dielectric reactive characteristic which varies with changes in electrical field strength applied across said element, and means electrically coupled to said element for varying the electric field strength applied thereacross in accordance with a modulating signal.

10. In the combination as set forth in claim 6, said cavity resonator comprising one of the cavity resonators of a multiple cavity type magnetron.

11. In combination, a vane type magnetron, and means for tuning said magnetron including an element mounted on the inner end portion of one of the vanes of said magnetron, said element being formed of a ceramic, ferroelectric material of the type having a dielectric reactive characteristic which varies with changes in electric field strength across said element, a conductive member in electrical contact with said element and spaced from said one vane, and a source of modulating signal connected across said element and one vane, whereby changes in the amplitude of said modulating signal cause changes in the electric field strength applied across said element resulting in changes in the frequency output of said magnetron.

12. A magnetron formed with at least one cavity resonator therein, means for tuning said magnetron including an element positioned in said cavity resonator formed of a material of the type having a dielectric reactive characteristic which varies with changes in electrical field strength applied across said element, and connection means for a source of voltage connected to said element for applying an adjustable field thereacross.

References Cited in the file of this patent

UNITED STATES PATENTS

| | | |
|---|---|---|
| 2,107,387 | Potter | Feb. 8, 1938 |
| 2,323,201 | Carter | June 29, 1943 |
| 2,402,948 | Carlson | July 2, 1946 |
| 2,435,984 | Spencer | Feb. 17, 1948 |
| 2,526,207 | Donley et al. | Oct. 17, 1950 |
| 2,555,959 | Curtis | June 5, 1951 |

| | | |
|---|---|---|
| 2,566,478 | Becker | Sept. 4, 1951 |
| 2,587,136 | Gardner | Feb. 26, 1952 |
| 2,629,068 | Gottschalk et al. | Feb. 17, 1953 |

FOREIGN PATENTS

| | | |
|---|---|---|
| 574,837 | Great Britain | Jan. 23, 1946 |

OTHER REFERENCES

"Effect of Field Strength on Dielectric Properties of Barium Strontium Titanate" (Donley), R. C. A. Review, vol. VIII, No. 3, pp. 539–553 (September 1947). (Copy in Division 51.)